United States Patent
Dickinson

(10) Patent No.: US 7,775,934 B2
(45) Date of Patent: Aug. 17, 2010

(54) CONTROL SYSTEM AND METHOD FOR INTERNAL COMBUSTION ENGINE

(75) Inventor: Michael T. Dickinson, Hilliard, OH (US)

(73) Assignee: Honda Motor Co., Ltd., Tokyo (JP)

( * ) Notice: Subject to any disclaimer, the term of this patent is extended or adjusted under 35 U.S.C. 154(b) by 574 days.

(21) Appl. No.: 11/682,219

(22) Filed: Mar. 5, 2007

(65) Prior Publication Data

US 2008/0216796 A1    Sep. 11, 2008

(51) Int. Cl.
F16H 59/74     (2006.01)
B60W 10/04    (2006.01)
B60W 10/10    (2006.01)

(52) U.S. Cl. .................. 477/107; 477/102; 477/109
(58) Field of Classification Search ............. 477/107, 477/109, 100, 102; 123/406.12
See application file for complete search history.

(56) References Cited

U.S. PATENT DOCUMENTS

| | | | | |
|---|---|---|---|---|
| 4,724,723 | A | * | 2/1988 | Lockhart et al. ............ 477/102 |
| 5,072,630 | A | | 12/1991 | Kikuchi et al. |
| 5,309,791 | A | | 5/1994 | Takada et al. |
| 5,540,202 | A | | 7/1996 | Cullen et al. |
| 5,583,766 | A | | 12/1996 | Birchenough et al. |
| 5,876,301 | A | * | 3/1999 | Tabata et al. ............ 477/109 |
| 6,128,564 | A | | 10/2000 | Graf |
| 6,213,913 | B1 | | 4/2001 | Hirakata et al. |
| 6,234,147 | B1 | | 5/2001 | Hirakata et al. |
| 6,687,591 | B2 | * | 2/2004 | Abe ............................. 701/54 |
| 6,932,740 | B2 | | 8/2005 | Ward et al. |
| 7,462,129 | B2 | * | 12/2008 | Hrovat et al. ............... 477/107 |
| 2001/0047792 | A1 | | 12/2001 | Akazaki et al. |
| 2002/0033164 | A1 | | 3/2002 | Ogawa et al. |
| 2003/0045993 | A1 | | 3/2003 | Ohno et al. |
| 2004/0063540 | A1 | | 4/2004 | Kondo et al. |
| 2006/0068974 | A1 | | 3/2006 | Bauerle et al. |
| 2006/0112927 | A1 | | 6/2006 | Russell et al. |
| 2006/0180108 | A1 | | 8/2006 | Yasui |
| 2007/0117677 | A1 | * | 5/2007 | Ayabe et al. ................ 477/115 |

FOREIGN PATENT DOCUMENTS

| | | |
|---|---|---|
| JP | 01-232169 | 9/1989 |
| JP | 09310627 A * | 12/1997 |

OTHER PUBLICATIONS

Translation of JP09310627.*

* cited by examiner

Primary Examiner—Tisha D Lewis
(74) Attorney, Agent, or Firm—Mark E. Duell; Rankin, Hill & Clark LLP

(57) ABSTRACT

A control system and method for an internal combustion engine includes an intake manifold for directing airflow to a plurality of cylinders of the engine and an electronically controlled throttle valve disposed within the intake manifold for regulating airflow into the engine. An engine retard control determination module determines whether retard control of the engine is disabled. A throttle control module communicates with the electronically controlled throttle valve and modifies a throttle return trigger point during a transmission upshift when the retard control determination module determines that retard control of the engine is disabled.

20 Claims, 4 Drawing Sheets

CONTROL SYSTEM AND METHOD FOR INTERNAL COMBUSTION ENGINE

BACKGROUND

The present disclosure generally relates to a control system and method for an internal combustion engine, and more particularly to a control system and method that includes modifying a throttle return trigger point during a transmission upshift when retard control of the internal combustion engine is disabled.

It is known to modify engine ignition timing and throttle position, at least temporarily, in order to reduce engine power during clutch to clutch up-shifting in an automatic transmission. Reducing engine power by modifying ignition timing is often referred to as "engine retard control." It also known that engine retard control may be disabled during certain vehicle operating conditions, such as during engine warm-up (e.g., from cold temperatures). When engine retard control is disabled, clutch to clutch up-shifting typically progresses more slowly and a normal throttle return trigger point may be inappropriate. (i.e., not appropriate relative to the progress of the up-shift).

More particularly, the throttle position is typically modified by moving the throttle from an initial position to a more closed position until a certain gear ratio threshold value is reached. Reaching of the gear ratio threshold value can be referred to as the throttle return trigger point because the throttle is moved back to the initial position from the more closed position when the gear ratio threshold value is reached. The gear ratio threshold value, and thus the throttle return trigger point, is set to correspond to an expected duration of the up-shift such that the throttle returns to its initial position near the end of the up-shift which results in good feeling to the vehicle operator and low clutch heat. When engine retard control is disabled, however, the shift progresses more slowly and the gear ratio threshold value (i.e., the throttle return trigger point) no longer accurately corresponds to the duration of the up-shift. As a result, the throttle moves from the more closed position back to the initial position in the middle of the up-shift and results in poor feeling to the vehicle operator and high clutch heat.

SUMMARY

According to one aspect, a control system for an internal combustion engine is provided. More particularly, in accordance with this aspect, the control system includes an intake manifold for directing airflow to a plurality of cylinders of the engine. An electronically controlled throttle valve is disposed within the intake manifold for regulating air flow into the engine. An engine retard control determination module determines whether retard control of the engine is disabled. A throttle control module communicates with the electronically controlled throttle valve and modifies an initial throttle return trigger point during a transmission upshift when the retard control determination module determines that retard control of the engine is disabled.

According to another aspect, a throttle control method is provided for controlling a throttle valve disposed upstream of an internal combustion engine having retard control. More particularly, in accordance with the aspect, it is determined whether retard control of the engine is disabled and, when determined that the retard control of the engine is disabled, a throttle return trigger point associated with a transmission upshift occurring in a transmission operatively connected to the engine is modified.

According to still another aspect, a throttle control system is provided for an internal combustion engine operatively connected to a transmission. More particularly, in accordance with this aspect, the throttle control system includes an engine intake having a throttle valve disposed therein that is controllable by a throttle valve controller linked to an ECU for receiving control signals therefrom. A throttle control module of the ECU generates the control signals to move the throttle valve via the throttle valve controller to a more closed position for reducing engine power during an upshift of the transmission and returns the throttle valve via the throttle valve controller to an initial position at a throttle return trigger point. The throttle return trigger point is initially set to occur when a first gear ratio threshold value is reached during the upshift. An engine retard control determination module determines whether retard control of the engine has been disabled. The throttle control module modifies the throttle return trigger point when the engine retard control determination module determines that the retard control of the engine has been disabled such that the throttle return trigger point is set to occur when a second, higher gear ratio threshold value is reached during the upshift.

DETAILED DESCRIPTION

Figure 1:
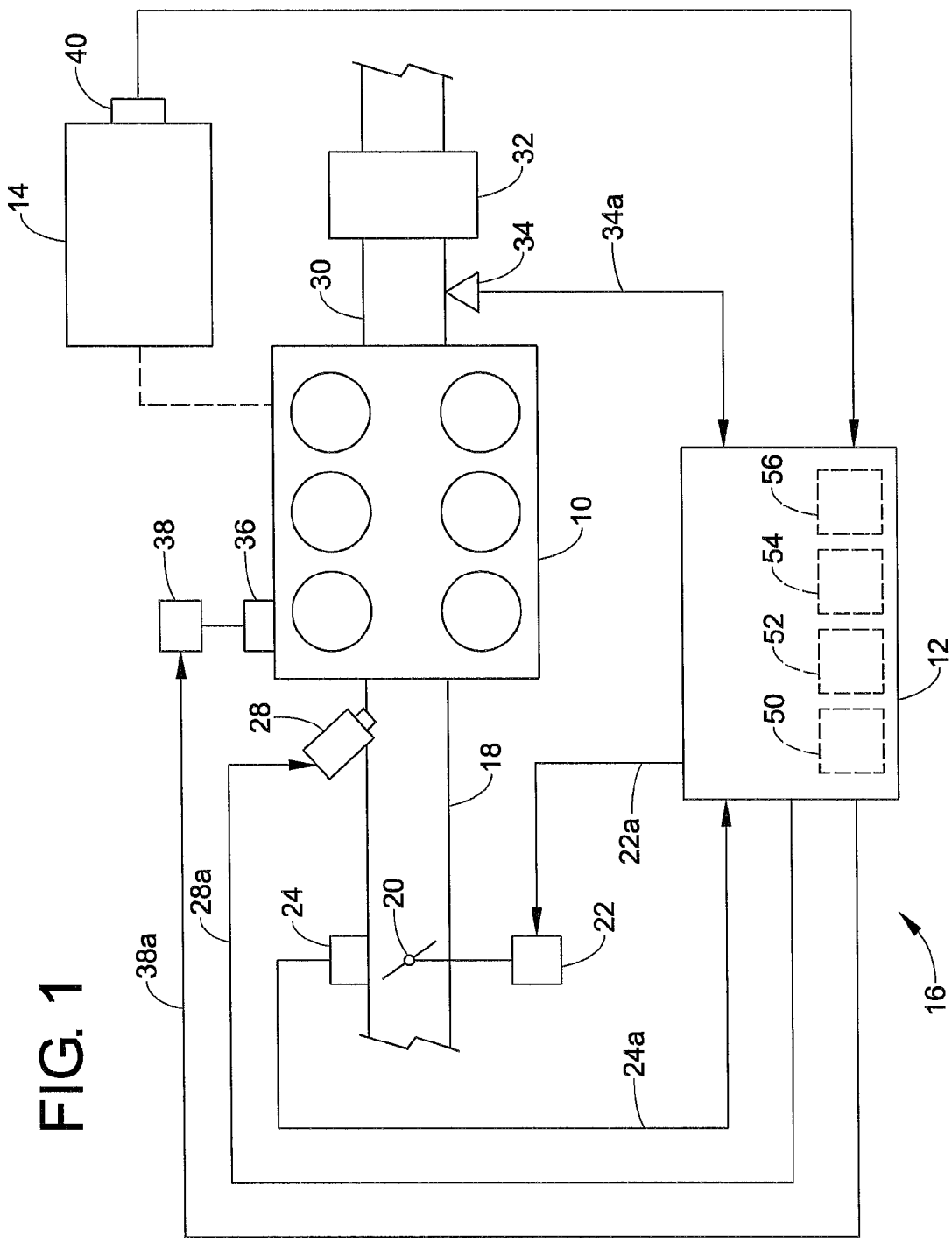
FIG. 1 is a schematic view of a throttle control system for an internal combustion engine operatively connected to a transmission that determines whether retard control of the engine is disabled and when so determined modifies a throttle return trigger point during a transmission upshift.

Referring now to the drawings wherein the showings are for purposes of illustrating one or more exemplary embodiments, FIG. 1 schematically shows an internal combustion engine 10, an electronic control unit (ECU) 12 for controlling the engine 10 during operation thereof, an automatic transmission 14 operatively connected to the engine 10 for effecting gear changes, and a control system 16 for the engine that considers whether retard control of the engine is disabled and when disabled modifies a throttle return trigger point during an upshift of the transmission. The internal combustion engine 10 of the illustrated embodiment is a six-cylinder engine and can be a V-type DOHC gasoline engine installed on a vehicle (not shown). Of course, as will be understood and appreciated by those skilled in the art, the engine 10 can have a different number of cylinders and/or be of some other type while still advantageously incorporating the features of the present disclosure. Also, it is to be appreciated by those skilled in the art that "automatic transmission" is intended to broadly cover all types of automatic transmissions, including any transmissions in which shifting is controlled automatically (e.g., an automated manual transmission).

As shown, the engine 10 is provided with an induction system including an intake pipe or manifold 18 for directing air flow to a plurality of cylinders of the engine and an electronically controlled throttle valve 20 disposed within the intake manifold for regulating airflow into the engine. The throttle valve 20 is driven by an electrically powered controller or motor 22 coupled thereto so that a degree of opening the throttle valve (throttle valve opening) TH can be controlled. The controller or motor 22 is linked to the ECU 12 for receiving control signals 22a therefrom. The throttle opening TH is detected by a throttle valve opening sensor 24 which sends to the ECU 12 a signal 24a indicative of the detected throttle opening TH. The ECU 12 controls the throttle valve opening TH through the motor 22 in accordance with an operating state of the engine 10, as will be described in further detail below, to control the amount of intake air to the engine. Other sensors (not shown), such as a pressure sensor for example, can be provided in association with the intake manifold and can be linked to the ECU 12 for communicating sensed conditions to the ECU. As used herein, a link or being linked is used broadly to cover any operative connection between components on the system 16 whether wired or wireless that enables the components to communicate (e.g., transmit a signal from one component to another).

Fuel injection valves 28, only one of which is shown, are inserted into the intake manifold 18 at locations intermediate between the cylinder block of the engine 10 and the throttle valve 20 and slightly upstream of the respective intake valves (not shown) of the engine. All of the fuel injection valves 22 are connected to a fuel pump (not shown) and linked to the ECU 12 for purposes of being individually controlled or operated (i.e., opened and/or closed) by the ECU 12 which thereby controls fuel injection therefrom. For example, as will be understood and appreciated by those skilled in the art, the ECU 12 could send a signal 28a, such as a drive signal, to one or more injectors that can be used to open or close the injector(s) for a predetermined amount of time.

The illustrated engine 10 further includes an exhaust pipe or manifold 30 fluidly connected to the plurality of cylinders of the engine 10, particularly through exhaust valves (not shown) of the cylinders. The exhaust manifold 30 can have a three-way catalyst 32 arranged therein for reducing emissions of exhaust gases, such as HC, CO, and NOx. Further, a LAF sensor 34 (oxygen concentration-detecting means) can be arranged in the exhaust manifold 30 at a location upstream of the three-way catalyst 32. When employed, the LAF sensor 34 can linearly detect the concentration of oxygen in exhaust gases in a broad air-fuel ratio range from a rich region to a lean region and deliver a signal (VLAF) 34a that is indicative of the detected concentration of oxygen to the ECU 12 which can use the transmitted signal to improve performance of the engine 10.

Further, the cylinders of the engine 10 have respective ignition plugs 36 (only one of which is schematically shown) inserted therein which are connected to the ECU 12 via a distributor or respective distributors 38. Each ignition plug 36 performs discharge by application of a high voltage thereto and following interruption of the same, whereby a mixture in the corresponding cylinder is ignited. Discharge by the plugs 36 can be controlled through control signals 38a sent by the ECU 12 to the distributor(s) 38.

As will be known and understood by those skilled in the art, the ECU 12 can include an input circuit having various functions including, for example, a function of shaping the wave forms of input signals from the various sensors, a function of correcting the voltage levels of the input signals to a predetermined level, and a function of converting analog signal values into digital signal values. The ECU 12 can also include a central processing unit (CPU), a read-only memory (ROM) which stores various types of data and programs that are used to control various parts of the engine, a random-access memory (RAM) which provides a working region for operations by the CPU, and an output circuit for supplying drive signals to, for example, the fuel injection valves 28, the throttle valve controller 22, and the distributor(s) 38. The signals delivered from the various sensors are each input or provided to the CPU via one or more input/output interfaces of the ECU. The CPU can determine operating conditions of the engine 10 based on the signals received from the sensors in accordance with programs read from the ROM and, depending on the operating conditions, carries out the control processes, including the process or processes described hereafter. In accordance with the described control processes and others, the CPU can then generate and deliver various output signals to components associated with the engine 12.

In one embodiment, the ECU (and specifically the CPU, ROM and/or RAM) includes several modules, including an engine retard control determination module 50 that determines whether retard control of the engine is disabled, a throttle control module 52 that communicates with or generates drive signals 22a and delivers the same to the electronically controlled throttle valve 20 and/or throttle valve controller 22a, a transmission upshift detection module 54 that detects when the automatic transmission 14 is effecting a transmission upshift, and a retard control module 56 that selectively applies retard control to the engine 10 for reducing power of the engine during a transmission upshift by modifying ignition timing of the engine.

As will be described in more detail below, the throttle control module 52 can modify a throttle return trigger point TRTP during a transmission upshift of the transmission 14 when the retard control determination module 50 determines that retard control of the engine 10 is disabled. The retard control module 56 can, as already indicated, selectively apply engine retard control to the engine 10 and can further disable such retard control during one or more predetermined operating conditions of the engine. For example, the one or more predetermined operating conditions of the engine 10 can include engine warm-up which occurs for a period of time after an initial startup of the engine during which the engine is warmed from a relatively cold temperature. The transmission upshift detection module 54 can indicate to the throttle control module 52 when it detects that the automatic transmission 14 is effecting a transmission upshift so that the throttle control module is able to modify the throttle return trigger point TRTP during the transmission upshift when the retard control determination module 50 determines that retard control of the engine has been disabled.

Figure 2:
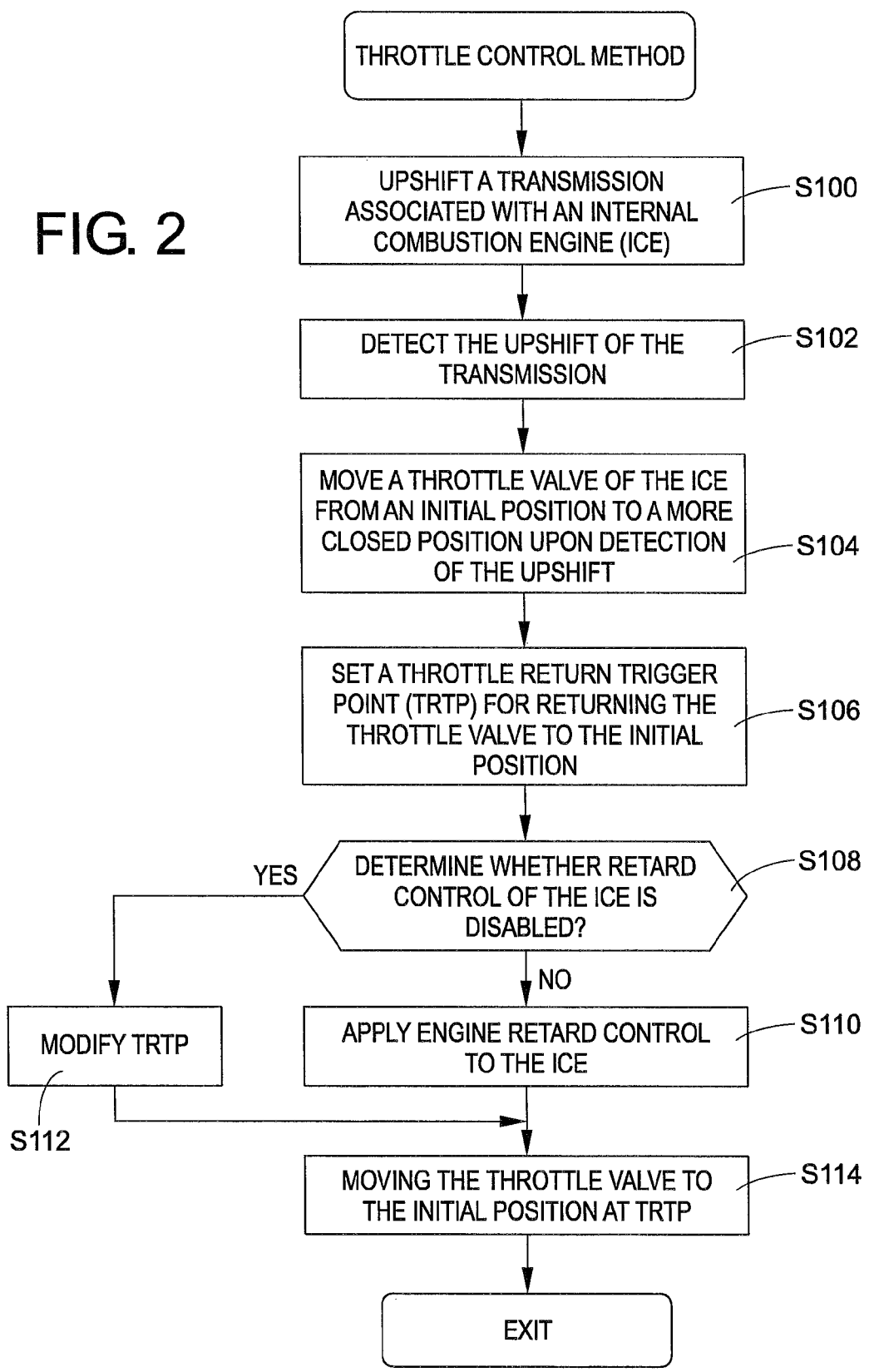
FIG. 2 is a block diagram illustrating a throttle control method for controlling a throttle valve disposed upstream of an internal combustion engine having retard control.

With additional reference to FIG. 2, a throttle control method for controlling the throttle valve 20 of the engine 10, which can be carried out by the CPU in the ECU 12, is shown that determines whether retard control of the engine 10 is disabled and, when determined that retard control of the engine is disabled, modifies a throttle return trigger point TRTP associated with a transmission upshift occurring in the transmission 14 operatively connected to the engine. More particularly, the process or method begins upon an upshift by the transmission 14 which is associated with the engine 10 as is known and fully understood by those skilled in the art (S100). When the transmission 14 is upshifted, the transmission upshift detection module 54 detects the upshift of the transmission 14 (S102). This could occur, for example, by sensor 40 of the transmission 14 indicating to the ECU 12 that an upshift is progressing or initiating.

Upon detection of the upshift in step S102, the throttle control module 52 and thus the ECU 12 function to reduce power of the engine during the transmission upshift by sending an output signal 22a to the controller 22 to command the electronically controlled throttle valve 20 to move from an initial position, which can be characterized as position $TH_I$, to a more closed position, which can be characterized as position $TH_R$ or a position that is more closed relative to position to $TH_I$ (S104). In operation, movement of the throttle valve 20 can occur at time $t_I$ which occurs very soon after the transmission upshift begins. For purposes of determining when the throttle valve 20 should return to its initial position $TH_I$, the throttle control module 50 sets the throttle return trigger point TRTP (the point at which the throttle valve 20 will return from its more open position $TH_R$ to its initial position $TH_I$) to an initial throttle return trigger point $TRTP_I$ set to occur when a first gear ratio threshold value $GRTV_1$ is reached during the upshift (S106), the first gear ratio threshold value $GRTV_1$ generally corresponding to an expected duration of the upshift when retard control of the engine is enabled. Thus, the throttle return trigger point normally occurs (i.e., when retard control is enabled and actively applied to the engine) when a throttle valve 20 returns to position $TH_I$ from the position $TH_R$ at the time the first gear ratio threshold value $GRTV_1$ is reached by the transmission 14.

Next, the retard control determination module 50 determines whether the retard control module 56 has disabled retard control of the engine 10 (S108). The step of determining whether retard control of the engine is disabled (S108) can include a preliminary step of disabling retard control of the engine 10 when one or more of the predetermined operating conditions of the engine are occurring (e.g., the engine initially operating in cold temperatures prior to engine warm-up). When determined in step S108 that retard control of the engine 10 has not been disabled, the retard control module 56 can reduce power of the engine during the transmission upshift by retarding ignition timing until the first gear ratio threshold value $GRTV_1$ is reached. As is known and understood by those skilled in the art, reaching the first gear ratio threshold value can be the primary factor in determining the duration of the ignition timing retardation, but additional timer values (e.g., a delay of a specified number of seconds) can be applied in addition to the first gear ratio threshold value $GRTV_1$. Similarly, if desired or appropriate, the throttle return trigger point could be adjusted by the use of a timer value in addition to the first gear ratio threshold value $GRTV_1$.

Returning to the throttle control method of FIG. 2, the engine retard control module 56 and thus the ECU 12 can send an appropriate signal 38a to the distributor(s) 38 for modifying the ignition timing via the ignition plugs 36 such that engine power is reduced during the transmission upshift. The modified ignition timing can occur until the first gear ratio threshold value is reached which is generally selected so as to correspond to an expected duration of the transmission upshift (and could be further adjusted by the use of timer values as described above). Thus, in the throttle control method of FIG. 2, engine retard control is applied to the engine 10 for reducing power of the engine by retarding ignition timing upon detection of an upshift of the transmission 14 unless the retard control of the engine is disabled (S110).

However, when the retard control determination module 50 determines that retard control of the engine is disabled in step S108, the throttle return trigger point TRTP is modified by the throttle control module 52 in step S112. Particularly, the throttle return trigger point TRTP is modified to occur when a second predetermined gear ratio threshold value $GRTV_2$ is reached during the transmission upshift such that the throttle valve 20 moves from the position $TH_I$ to the position $TH_R$ for a time until the second predetermined gear ratio threshold value $GRTV_2$ is reached. The second gear ratio threshold value $GRTV_2$ is generally higher than the first gear ratio valve $GRTV_1$ and the modification of the throttle return trigger point TRTP to the second gear ratio threshold value $GRTV_2$ is adapted to account for the transmission upshift of the transmission 14 progressing more slowly when retard control of the engine 10 is disabled. Thus, when the throttle control module 52 modifies the initial throttle return trigger point to a modified throttle return trigger point, the throttle return trigger point TRTP occurs when the second gear ratio threshold value $GRTV_2$ is reached.

The gear ratio of the transmission 14 can be measured by sensor 40 associated with the transmission 14. Alternatively, the gear ratio can be communicated to the ECU 12 through any other appropriate means known and understood by those skilled in the art. To determine if and when a gear ratio threshold is reached, such as the first and second gear ratio thresholds ($GRTV_1$ and $GRTV_2$), the sensed gear ratio is compared to an appropriate gear ratio threshold value. In any case, in step S114, the throttle valve 20 is moved from the more closed position $TH_R$ back to the initial position $TH_I$ when the throttle return trigger point TRTP is reached (whether the initially set TRTP or the modified TRTP). Again, the throttle return trigger point TRTP is initially set to occur when the first gear ratio threshold value $GRTV_1$ is reached. Unless modified, the throttle valve 20 will return to the initial position $TH_I$ at about the time the first gear ratio threshold value $GRTV_1$ is reached. However, if the throttle return trigger point TRTP is modified in step S112, then the throttle valve 20 will not return to the initial position $TH_I$ until the second gear ratio threshold value $GRTV_2$ is reached. Typically, this results in the throttle valve 20 not returning to the initial position $TH_I$ until a later time that more closely approximates the longer duration of the transmission upshift when engine retard control is disabled.

Figure 3:
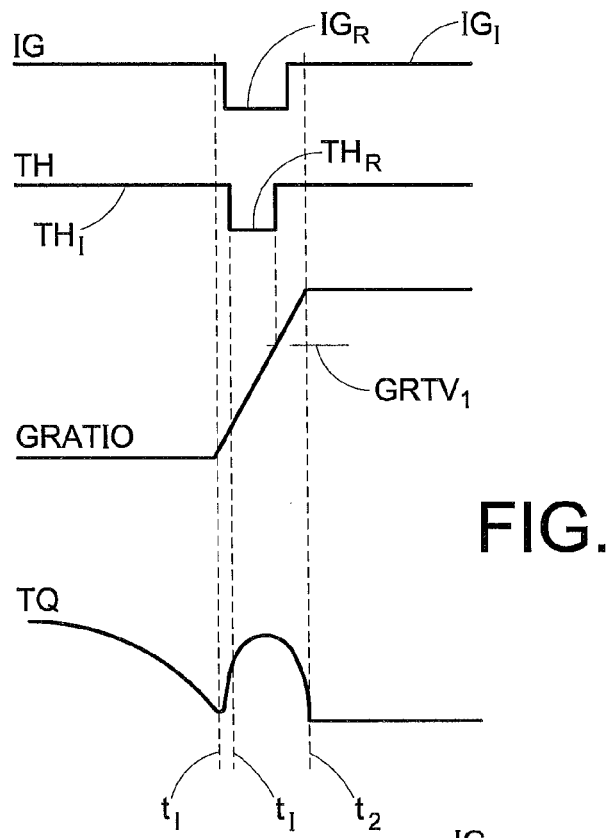
FIG. 3 is a timing chart showing ignition timing and throttle opening of an internal combustion engine being modified (i.e., retard control is enabled) during an upshift of a transmission.

Turning to FIG. 3, a timing diagram for an example transmission upshift is shown, particularly for a transmission upshift during which engine retard control is enabled and applied. More particularly, the upshift begins at approximately time $t_1$ and is complete at approximately time $t_2$. As shown, an initial throttle position $TH_I$ is modified or reduced (i.e., the throttle valve 20 is closed) to a more closed throttle position $TH_R$ at time $t_I$ until a first gear ratio threshold value $GRTV_1$ is reached The throttle return trigger point TRTP is set to occur at the first gear ratio threshold value and, as shown, occurs toward the end of the up-shift (i.e., relatively close to time $t_2$). The ignition timing IG is also modified until the first gear ratio valve $GRTV_1$ is reached and, in the illustrated example, includes a slight timing delay such that ignition timing returns from its retarded state (IGR) to its initial state (IGI) slightly after the first gear ratio threshold value $GRTV_1$. is reached. Torque TQ occurring during the upshift is shown as including a moderate bump-up during the transmission upshift which generally provides good feeling to the vehicle operator and low clutch heat within the transmission 14. The acceptable torque TQ is due in part to the throttle return trigger point being set and occurring toward the end of the up-shift (i.e., relatively close to time $t_2$).

Figure 4:
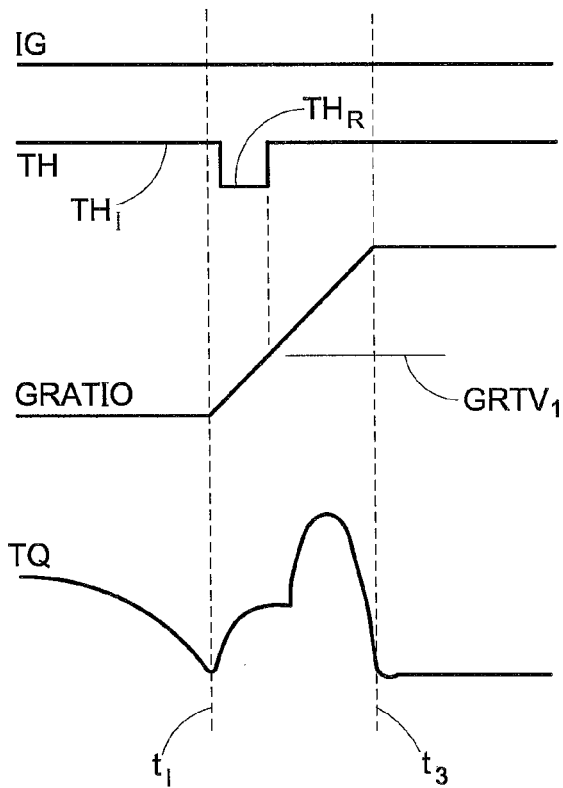
FIG. 4 is a timing chart showing only throttle opening being modified (i.e., retard control is disabled) during an upshift of a transmission.

With reference now to FIG. 4, a transmission upshift timing diagram is shown for a transmission that disables retard control (i.e., ignition timing is not modified) and does not use the control system and method disclosed in the present disclosure. As shown, ignition timing IG is not modified. Throttle opening TH is modified from an initial position $TH_I$ to a more closed position $TH_R$ until the first gear ratio threshold value $GRTV_1$ is reached. When the first gear ratio threshold value $GRTV_1$ is reached, i.e., the initial throttle return trigger point, the throttle valve is returned to its initial position $TH_I$. As shown, the progression of the upshift occurs much more slowly when engine retard control is disabled which is due to ignition timing not being modified when engine retard control is disabled. The time for the upshift from time $t_1$ to time $t_3$ is thus greater than the time for the upshift depicted in FIG. 3 between time $t_1$ and time $t_2$. As illustrated, the throttle return trigger point TRTP (i.e., a point in time at which the throttle valve moves from the position $TH_R$ back to the position $TH_I$) occurs when the first gear ratio threshold value $GRTV_1$ is reached; however, this still corresponds to the more rapid up-shift of FIG. 3 resulting in a return of the throttle to the position $TH_I$ relatively early in the upshift of FIG. 4 which causes a spike in the torque TQ. This spike in the torque provides a poor feeling to the vehicle operator and also can cause high clutch heat to occur in the transmission 14.

Figure 5:
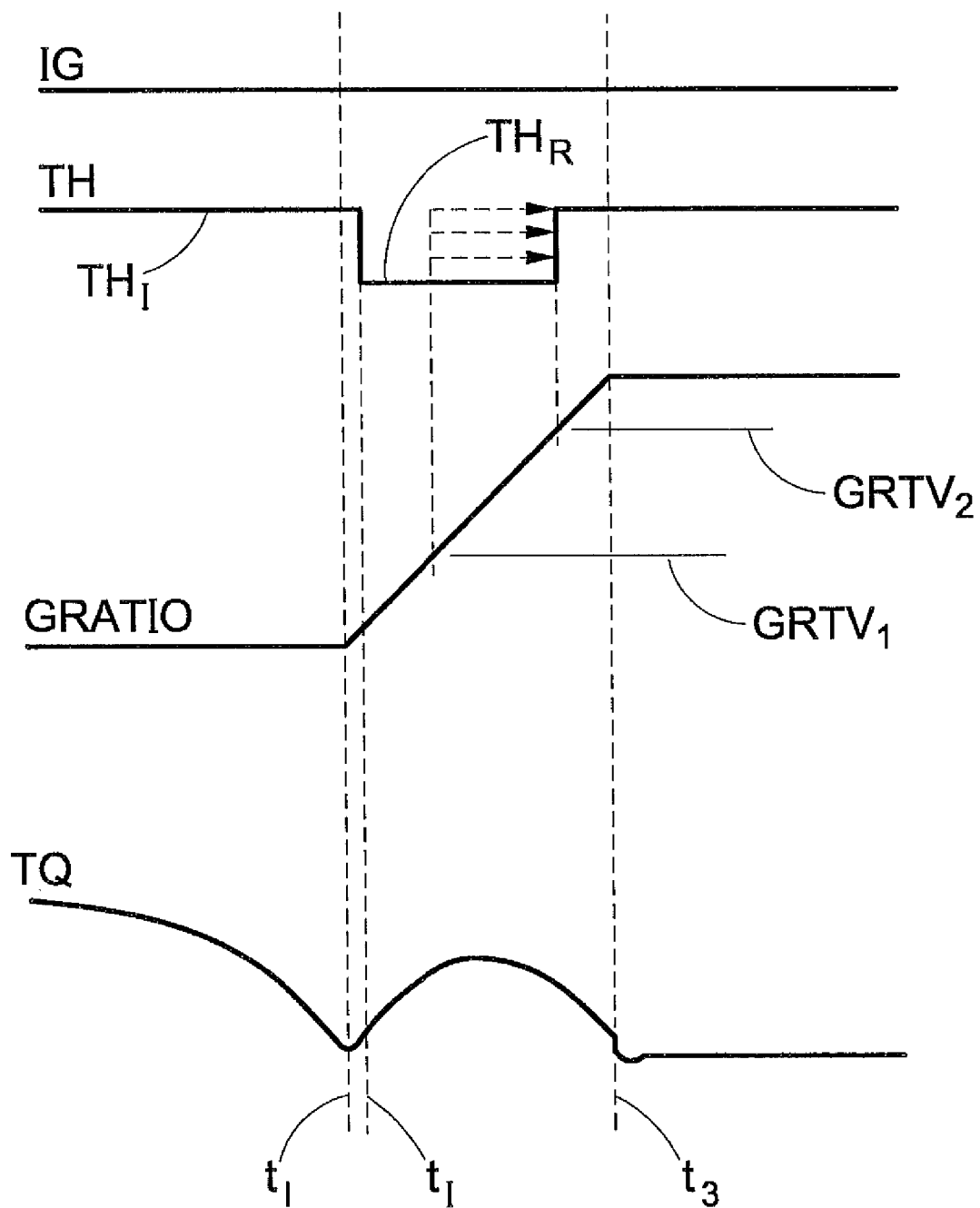
FIG. 5 is a timing chart showing only throttle opening being modified (i.e., retard control is disabled) during an upshift of a transmission and having a throttle return trigger point modified to more appropriately correspond to the duration of the transmission upshift.

Now with reference to FIG. 5, a transmission timing diagram is shown according to the control system and method of the present disclosure (e.g., the control system and method of FIGS. 1 and 2) and specifically shown when engine retard control is disabled and a throttle return trigger point TRTP is modified. More particularly, as shown, ignition timing IG is not modified and engine retard control in this example is disabled. As before, the throttle position TH moves from an initial position $TH_I$ to the more closed position $TH_R$ during the transmission upshift at time $t_I$. However, in this example, which corresponds to the throttle control method of FIG. 2, the throttle return trigger point TRTP is modified to occur when the second gear ratio threshold value $GRTV_2$ is achieved (as opposed to the initially set first gear ratio threshold value $GRTV_1$). When the second gear ratio threshold value $GRTV_2$ is reached, the throttle valve moves from the more open position $TH_R$ back to the initial position $TH_I$. In the illustrated example, the throttle valve returns to its initial position at a much later point in time relative to the progression of the transmission upshift which extends from the time $t_1$ to $t_3$. As a result, with engine retard control disabled and not applied during a transmission upshift good feeling is felt by the vehicle operator and low clutch heat occurs within the vehicle transmission 14.

It will be appreciated that various of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art which are also intended to be encompassed by the following claims.

The invention claimed is:

1. A control system for an internal combustion engine, comprising:
   an intake manifold for directing airflow to a plurality of cylinders of the engine;
   an electronically controlled throttle valve disposed within said intake manifold for regulating airflow into the engine;
   an engine retard control determination module determining whether retard control of the engine is disabled; and
   a throttle control module communicating with said electronically controlled throttle valve, said throttle control module commanding movement of said throttle valve from an initial position to a more closed position upon detection of a transmission upshift, the throttle control module initially setting a throttle return trigger point to be a point in time when a first gear ratio threshold value is reached but modifying the initial throttle return trigger point during said transmission upshift when said retard control determination module determines that retard control of the engine is disabled, and said throttle control module further commanding movement of said throttle valve back to said initial position at said throttle return trigger point.

2. The control system of claim 1 further including an ECU for controlling operation of the engine, said ECU including said engine retard control determination module and said throttle control module.

3. The control system of claim 1 further including:
   an automatic transmission operatively connected to the engine for effecting gear changes, including said transmission upshift, during operation of the engine; and
   a transmission upshift detection module detecting when said automatic transmission is effecting said transmission upshift, said transmission upshift detection module indicating to said throttle control module when detected that said automatic transmission is effecting said transmission upshift so said throttle control module is able to modify said initial throttle return trigger point during said transmission upshift when said retard control determination module determines that said retard control of the engine is disabled.

4. The control system of claim 1 further including an engine retard control module that reduces power of the engine during said transmission upshift by modifying ignition timing of the engine when retard control of the engine is enabled.

5. The control system of claim 4 wherein said engine retard control module disables said retard control during one or more predetermined operating conditions of the engine.

6. The control system of claim 5 wherein said one or more predetermined operating conditions of the engine include engine warm-up which occurs for a period of time after initial startup of the engine during which the engine is warmed-up from a relatively cold temperature.

7. The control system of claim 4 wherein said engine retard control module reduces power of the engine during said transmission upshift by retarding ignition timing until said initial throttle return trigger point is reached which corresponds to an expected duration of said transmission upshift.

8. The control system of claim 1 wherein said throttle control module reduces power of the engine during said transmission upshift by commanding said electronically controlled throttle valve to move from said initial position to said more closed position until said initial throttle return trigger point is reached when retard control is enabled, said first gear ratio threshold value corresponding to an expected duration of said transmission upshift when retard control is enabled.

9. The control system of claim 8 wherein, when said retard control determination module determines that said retard control of the engine is disabled, said initial throttle return trigger point is modified to a modified throttle trigger point, said modified throttle return trigger point set as a second gear ratio threshold value by said throttle control module, said throttle control module reducing power of the engine during said transmission upshift by commanding said electronically controlled throttle valve to move from said initial position to said more closed position until said modified throttle return trigger point is reached when retard control is disabled and then said throttle valve returns to said initial position, said second gear ratio threshold value corresponding to an expected duration of said transmission upshift when retard control is disabled.

10. A control system for an internal combustion engine, comprising:
- an intake manifold for directing airflow to a plurality of cylinders of the engine;
- an electronically controlled throttle valve disposed within said intake manifold for regulating airflow into the engine;
- an engine retard control determination module determining whether retard control of the engine is disabled;
- a throttle control module communicating with said electronically controlled throttle valve and modifying an initial throttle return trigger point during a transmission upshift when said retard control determination module determines that retard control of the engine is disabled;
- wherein said initial throttle return trigger point is modified to correspond to said second gear ratio threshold value that is adapted to account for said transmission upshift progressing more slowly when said retard control is disabled, said initial throttle return trigger point occurs when said throttle valve returns to a position $TH_I$ from a position $TH_R$ when a first gear ratio threshold value is reached during said retard control, said position $TH_R$ of said throttle valve being more closed than said position $TH_I$ and said first gear ratio threshold value corresponding to an expected duration of said transmission upshift with retard control; and
- when said throttle control module modifies said throttle return trigger point, said throttle return trigger point occurs, and thus said throttle valve returns to said position $TH_I$ from a position $TH_R$, when a second gear ratio threshold value is reached which corresponds to an expected longer duration of said transmission upshift with retard control disabled.

11. A throttle control method for controlling a throttle valve of an internal combustion engine:
- determining whether retard control of the engine is disabled;
- when determined that said retard control of said engine is disabled, modifying a throttle return trigger point associated with a transmission upshift occurring in a transmission operatively connected to the engine;
- moving said throttle valve from a position $TH_I$ to a position $TH_R$ that is more closed than position $TH_I$ upon detection of said transmission upshift;
- before modifying said throttle return trigger point, initially setting said throttle return trigger point to be a point in time when a first gear ratio threshold value is reached; and
- moving said throttle valve from said position $TH_R$ back to said position $TH_I$ at said throttle return trigger point.

12. The throttle control method of claim 11 wherein, when said throttle return trigger point is modified, said throttle return trigger point is modified to be a point in time when a second gear ratio threshold value is reached that is higher than said first gear ratio threshold value.

13. The throttle control method of claim 11 further including:
- upshifting said transmission associated with the engine; and
- detecting said upshift of said transmission operatively connected to the engine.

14. The throttle control method of claim 11 wherein said step of determining whether retard control of the engine is disabled includes a preliminary step of disabling retard control of the engine during one or more predetermined operating conditions of the engine.

15. The throttle control method of claim 14 further including:
- applying engine retard control to the engine, unless said retard control is disabled, to thereby reduce power of the engine by retarding ignition timing upon said detection of said upshift of said transmission.

16. The throttle control method of claim 14 further wherein said one or more predetermined operating conditions include engine warm-up which occurs for a period of time after initial startup of the engine during which the engine is warmed-up form a relatively cold temperature.

17. A throttle control system for an internal combustion engine operatively connected to a transmission, comprising:
- an engine intake having a throttle valve disposed therein that is controllable by a throttle valve controller linked to an ECU for receiving control signals therefrom;
- a throttle control module of said ECU that generates said control signals to move said throttle valve via said throttle valve controller to a more closed position for reducing engine power during an upshift of the transmission and returns said throttle valve via said throttle valve controller to an initial position at a throttle return trigger point, said throttle return trigger point initially set to occur when a first gear ratio threshold value is reached during said upshift; and
- an engine retard control determination module determining whether retard control of the engine has been disabled, said throttle control module modifying said throttle return trigger point when said engine retard control determination module determines that said retard control of the engine has been disabled such that said throttle return trigger point is set to occur when a second, higher gear ratio threshold value is reached during said upshift.

18. The throttle control system of claim 17 further including a transmission upshift detection module detecting when the transmission is effecting said upshift, said transmission upshift detection module indicating to said throttle control module when detected that the transmission is effecting said upshift so said throttle control module is able to modify said throttle return trigger point when said retard control determination module determines that said retard control of the engine is disabled.

19. The throttle control system of claim 18 wherein said retard control includes an engine retard control module that reduces power of the engine during said transmission upshift by modifying ignition timing of the engine and disables said retard control during engine warm-up.

20. The throttle control system of claim 18 wherein said first gear ratio threshold value corresponds to an expected duration of said upshift occurring with said retard control and modifying said throttle return trigger point to occur when a second gear ratio threshold value is reached during said upshift is adapted to account for said upshift progressing more slowly when said retard control is disabled.

* * * * *